Sept. 21, 1937.　　　　A. F. STRACK　　　　2,093,939
ELECTRICAL HEATER FOR COOKING PURPOSES
Filed Dec. 19, 1935　　　3 Sheets-Sheet 1
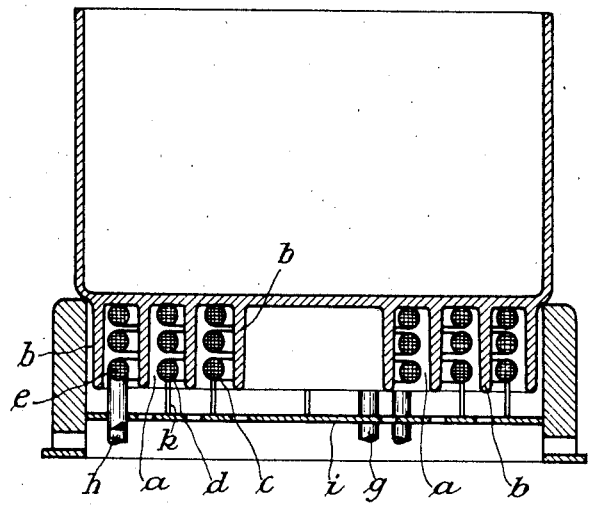
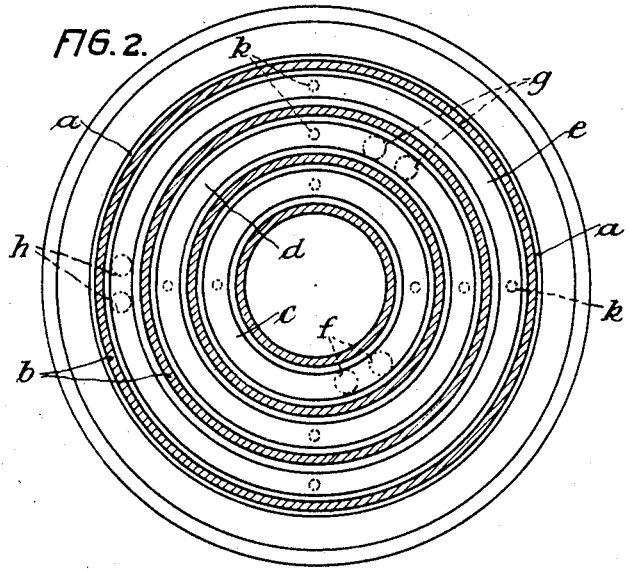
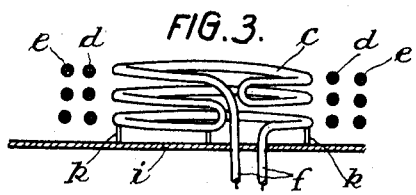
Inventor:
Albert Friedrich Strack
By Emil Bönnelyche
Attorney

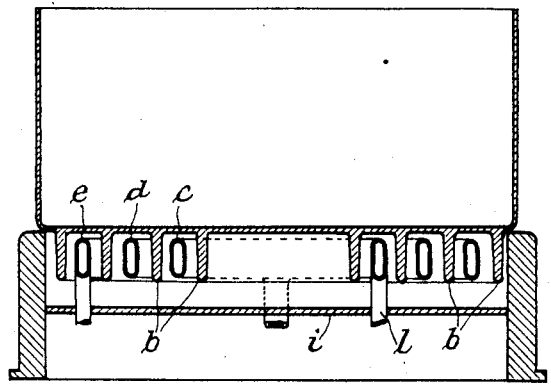
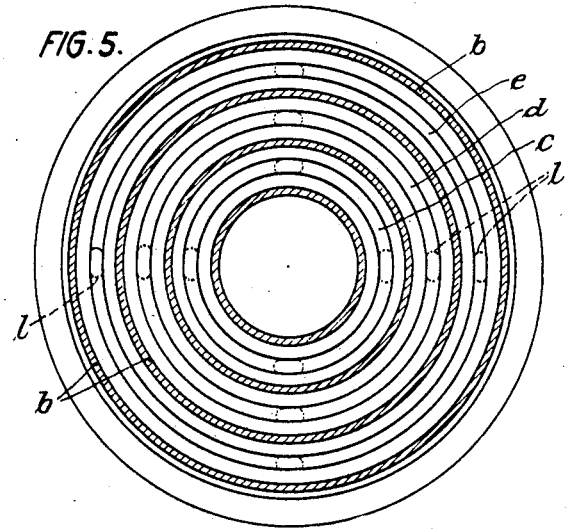

Inventor:
Albert Friedrich Strack
By Emil Bönnelyche
Attorney

Patented Sept. 21, 1937

2,093,939

UNITED STATES PATENT OFFICE 2,093,939

ELECTRICAL HEATER FOR COOKING PURPOSES

Albert Friedrich Strack, Suresnes, France

Application December 19, 1935, Serial No. 55,250
In Germany December 24, 1934

8 Claims. (Cl. 219—43)

This invention relates to an electrical heater for saucepans and other cooking vessels of the type furnished on the outer walls, and more particularly on the bottom, with ribs or other projections serving to increase the heat-transfer area. According to the invention, the heater is so arranged that the ribs or other projections on the vessel are accommodated in pockets or recesses formed by electrical heating elements, i. e., tubes which are composed of a heat-resisting material and have resistance wires incorporated therein, and which radiate the heat from the electrically heated resistance wires with a minimum of loss towards the outside. To form the pockets or recesses adapted to receive the ribs or projections on the cooking vessel the said heating elements may be superimposed or juxtaposed according to requirements, in such fashion that the pockets or recesses thus formed correspond in form and disposal with the ribs or projections on the vessel. Conveniently, they may consist of so-called Backer resistances. Several series of heating tubes arranged side by side or superimposed may be connected to form a continuous series. The tubes are secured in suitable fashion to a common supporting plate, where they are connected with the current source. By reason of the invention there is provided an electrical heater for cooking purposes which is very simple in its assembly and its production and at the same time is effective and economical in use. In the case of a heater of this kind the period required for heating, under conditions otherwise the same, is reduced by more than one-third as compared with the usual electrical heaters, with at the same time a considerable saving of current.

In one form of embodiment of the invention the heating tubes radiate the heat in direct fashion to the ribs or projections on the cooking vessel fitting into the pockets or recesses. In other forms of embodiment there may be provided an intermediate plate, which receives the heat from the heating tubes and transfers the same to the cooking vessel.

The invention will be described more fully with reference to the accompanying drawings, in which Figs. 1 and 2 are a longitudinal section and plan view respectively of one embodiment of an electrical heater according to the invention.

Fig. 3 is a perspective view supplementing the illustration in Figs. 1 and 2.

Fig. 4 is a sectional view of a modified form of embodiment,

Fig. 5 being a plan view of Fig. 4.

Figure 6:
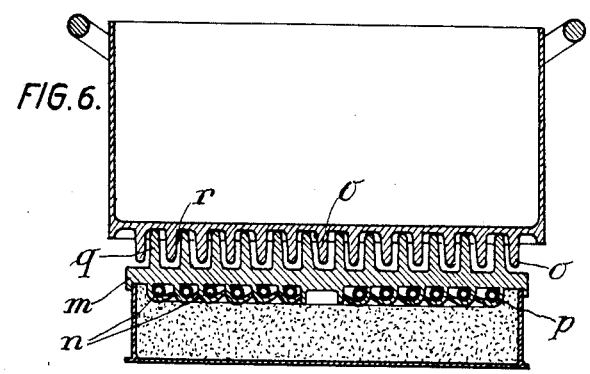
Figure 8:
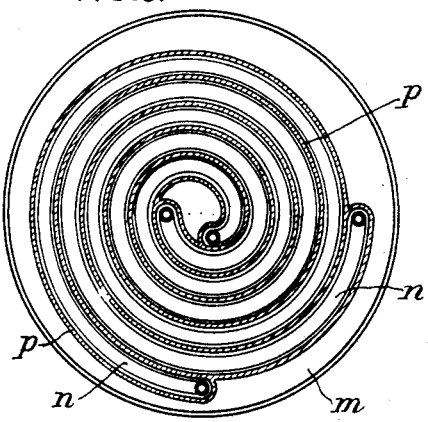
Figure 7:
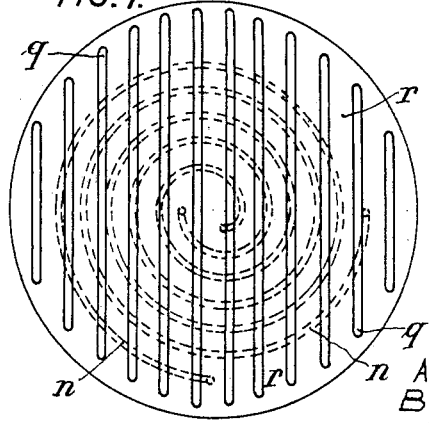

Figs. 6 to 8 show an additional form of embodiment in vertical section, in plan view on the heating plate, and in horizontal section respectively.

Figure 9:
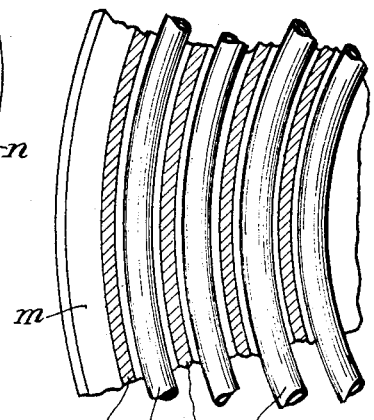

Fig. 9 shows a portion of Fig. 8 on enlarged scale.

In the form of embodiment according to Figs. 1 to 3 concentric, circular, pocket-like recesses $a$ for reception of the annular ribs $b$ on the bottom of a cooking vessel are formed by annularly disposed metallic tubes $c$, $d$ and $e$, which have electrical resistances, such as so-called Backer resistances, incorporated therein. The three superimposed rings $c$ and also the rings $d$ and the rings $e$ are in each case connected to form a continuous series, as shown in respect of the tubes $c$ in Fig. 3.

The ends $f$ of the series $c$ and also the ends $g$ and $h$ of the series $d$ and $e$ respectively are passed through a supporting plate $i$, to which they are welded. The plate $i$ may be furnished with openings for the passage of air. Preferably the single series are supported by feet $k$. The heater composed of the heating tubes as described is accordingly supported by the plate $i$, which in turn is mounted on an upright outer ring, the upper edge of which is capable of supporting the cooking vessel. The heating tubes or resistance wires respectively are furnished with the requisite electrical connections.

According to Fig. 4, the heater may also consist of simple concentric rings $c$, $d$ and $e$. The heating tubes may be of elongated or oval cross-section, as shown, or also of circular cross-section as in the previous embodiment. These tubes or rings may be secured to the plate $i$ by means of single feet or by a plurality of feet, such as $l$ (Figs. 4 and 5), the feet or supports at the same time serving to receive and guide the electric leads.

The construction of the heater from tubes, which form the pockets for reception of the ribs or projections on the cooking vessel, also results in the advantage of a simple method of manufacture and in that of a favorable transmission of the heat by radiation with negligible loss, inasmuch as merely a small part of the heat is able to escape by way of the supporting plate $i$ and may be additionally reduced by insulation of the feet of the tubes or of the holding plate.

The pockets formed by the heating tubes do not require to be annular in form as shown in the drawings. They may also be disposed in straight lines, for example arranged to be parallel to each other or radial, dependent on the form and arrangement of the ribs or projections on the bottom or the side walls of the cooking vessel.

In the form of embodiment according to Figs. 6 to 9 the transmission of the heat from the tubes $n$ to the ribs $o$ on the vessel takes place indirectly by means of the correspondingly constructed plate $m$ carrying the heating rings. These rings or tubes $n$ are carried on the under side of the plate $m$ by rib-like abutments $p$ which, after application of the rings $n$, are bent into a form suitable to support the rings. The heating tubes may also be applied to or embedded in the lower side of the plate in other fashion. On the upper side of the plate there are provided ribs $q$, which form the pockets $r$ for reception of the ribs $o$ on the cooking vessel. In this connection the ribs $q$ may have any desired different disposal in relation to the heating tubes $n$. For example, as shown in the drawings, the ribs $q$ may be disposed in a straight line and situated parallel to each other, corresponding with the ribs $o$ on the cooking vessel, whilst the tubes may be of spiral form.

The heating tubes $n$ transfer their entire heat to the plate $m$, which moreover is also well insulated downwards and consists of a good conductive metal, such as aluminum or copper, so that the heat acquired by the plate passes in its entirety from the walls of the pockets $r$ to the ribs or projections $o$ on the bottom of the vessel introduced into the pockets.

Since in the arrangement according to the invention the transfer of the heat to the bottom of the cooking vessel takes place primarily by radiation, there may conveniently be provided between the walls of the pockets and the ribs air spaces, as a result of which a rubbing action between the ribs and the walls of the pockets is avoided. In consequence it is also possible to employ in respect of the ribs on the cooking vessel, particularly if these consist of aluminium, oxidized or dark-colored surfaces, which possess better powers of radiation than light or bright surfaces. These surfaces are not subject to wear, as owing to the air spaces there is no rubbing action between them.

If desired, the heater may also be composed of exposed electrical heating resistances, that is to say—of resistance elements having no covering tubes. These then require to be insulated, and should have no metallic contact with the cooking vessel, for which purpose there may be provided suitable air spaces or the cooking vessel may be composed wholly or in part of a non-conductive material. The resistances should preferably be protected against impact or against contact with liquids.

If it is desired to make the vessel and the heater integral, the tubes may be embedded in direct fashion in the bottom of the vessel, in which case the tubes are supported by correspondingly shaped ribs on the vessel.

What I claim as new and desire to secure by Letters Patent is:

1. In an electrical heater for cooking vessels having external projections for increasing the heat transfer, heating elements comprising heat-resisting tubes and resistance wires incorporated therein, the said elements being arranged to form recesses for reception of the projections on the said cooking vessel, and the width of the said recesses being greater than the thickness of the said projections to provide for clearance between the said projections and the said heating elements.

2. In an electrical heater for cooking vessels having external projections for increasing the heat transfer, superimposed series of concentrically disposed heating elements arranged to form recesses for reception of the projections on the said cooking vessel, the single series of said elements being interconnected, and the width of the said recesses being greater than the thickness of the said projections to provide for clearance between the said projections and the said heating elements.

3. In an electrical heater for cooking vessels having external projections for increasing the heat transfer, concentric series of superimposed heating elements arranged to form recesses for reception of the projections on the said cooking vessel, the single series of said elements being interconnected, and the width of the said recesses being greater than the thickness of the said projections to provide for clearance between the said projections and the said heating elements.

4. In an electrical heater for cooking vessels having external projections for increasing the heat transfer, heating elements constituting elevations on the said heater arranged to form recesses for reception of the projections on the said cooking vessel, and a plate supporting the said heating elements, the ends of the said elements being connected with the said plate, and the width of the said recesses being greater than the thickness of the said projections to provide for clearance between the said projections and the said heating elements.

5. In an electrical heater for cooking vessels having external projections for increasing the heat transfer, heating elements constituting elevations on the said heater arranged to form recesses for reception of the projections on the said cooking vessel, the said elements being arranged concentrically and superimposed, and a plate supporting the said heating elements, the elements constituting the wall of each recess forming a continuous series and the ends of the said series being connected with the said plate, and the width of the said recesses being greater than the thickness of the said projections to provide for clearance between the said projections and the said heating elements.

6. In an electrical heater for cooking vessels having external projections for increasing the heat transfer, heating elements arranged to form recesses for reception of the projections on the said cooking vessel, a ring surrounding the said elements and supporting the said cooking vessel peripherally, and a plate within the said ring supporting the said elements from below, and the width of the said recesses being greater than the thickness of the said projections to provide for clearance between the said projections and the said heating elements.

7. In an electrical heater for cooking vessels having external projections for increasing the heat transfer, heating elements arranged to form recesses for reception of the projections on the said cooking vessel, a supporting plate, and feet supporting the said elements on the said plate, and the width of the said recesses being greater than the thickness of the said projections to provide for clearance between the said projections and the said heating elements.

8. In an electrical heater for cooking vessels having external projections for increasing the heat transfer, heating elements constituting elevations on the said heater arranged to form recesses for reception of the projections on the said cooking vessel, the width of the said recesses being greater than the thickness of the said projections so as to provide for clearance between the said projections and the said heating elements.

ALBERT FRIEDRICH STRACK.